Patented Jan. 26, 1943

2,309,404

UNITED STATES PATENT OFFICE 2,309,404

DIIODOTYROSIN SOLUTIONS

Kurt Kraft and Ferdinand Dengel, Mannheim, Germany, assignors to E. Bilhuber Inc., Orange, N. J., a corporation of New Jersey No Drawing. Application June 20, 1940, Serial No. 341,462. In Germany March 13, 1939

2 Claims. (Cl. 260—521)

The present invention deals with concentrated stable solutions of diiodotyrosin and process for their production.

According to the present invention it has been found that concentrated stable solutions of diiodotyrosin may be obtained by allowing more than one equivalent of basic substance to react with diiodotyrosin. When two or more equivalents of a base are employed with diiodotyrosin, the phenolic hydroxyl as well as the carboxyl hydroxy react to form a phenolate carboxy salt which is sufficiently stable in solution to permit sterilization by heating without danger of decomposition. This could not be foreseen as in general phenolates are much more sensitive to heat than free phenols. In some cases, especially if weak basic compounds are employed, the thermal stability of the solutions may still be increased by the addition of more than two equivalents of the base.

As basic substances preferably alkali metal and/or alkaline earth metal hydroxides, alkali carbonates or bicarbonates, ammonia or organic amines may be employed.

Examples (1) 10 ccm. of $$\frac{n}{10}$$

sodium hydroxide or potassium hydroxide solution (2.1/2000 mol) are poured over 0.2165 gms. of diiodotyrosin (1/2000 mol). The colorless solution which forms is sterilized promptly.

(2) 0.2165 gms. of diiodotyrosin (1/2000 mol) are added to 0.037 gms. of calcium hydroxide (2.1/2000 equivalents). 12 ccm. of water are poured over this mixture. The clear solution which is obtained upon heating, is sterilized.

(3) 4.63 ccm. of n sodium hydroxide solution (2.1/433 mol) are poured over 1.0 gm. of diiodotyrosin (1/433 mol) which is dissolved thereby. The solution is made up by addition of water to a total volume of 10 ccm. The resulting colorless 10% solution is sterilized.

(4) To a mixture of 0.6495 gms. of diiodotyrosin (3.1/2000 mol) and 0.055 gms. of calcium hydroxide (3.1/2000 equivalent) 15 ccm. of $$\frac{n}{10}$$

sodium hydroxide lye (3.1/2000 equivalent) and 18 ccm. of water are added. By gentle heating a clear solution is obtained which is sterilized.

(5) 10 ccm. of an aqueous solution of ammonia which contains 6.4.1/2000 mol of NH$_4$OH are poured over 0.2165 gms. of diiodotyrosin (1/2000 mol). The resulting colorless solution is sterilized at 100° C.

(6) 20 ccm. of an aqueous solution of $$\frac{n}{10}$$

diethylamine (4.1/2000 mol) is poured over 0.2165 gms. of diiodotyrosin (1/2000 mol). The resulting colorless solution is sterilized at 100° C.

Having now particularly described and ascertained the nature of our said invention and in what manner the same is to be performed, we declare that what we claim is:

1. Concentrated stable and sterilizable solutions containing per molecule of diiodotyrosin 2 equivalents of a basic compound selected from the group consisting of hydroxides, bicarbonates and carbonates of alkali metals, alkaline earth metals, ammonia and organic amines.

2. Concentrated stable and sterilizable solutions containing per molecule of diiodotyrosin more than 2 equivalents of a basic compound selected from the group consisting of hydroxides, bicarbonates and carbonates of alkali metals, alkaline earth metals, ammonia and organic amines.

KURT KRAFT.
FERDINAND DENGEL.